United States Patent [19]

Higbee

[11] 4,386,744
[45] Jun. 7, 1983

[54] COMFORT MECHANISM FOR SAFETY BELT RETRACTORS

[75] Inventor: Wallace C. Higbee, Romeo, Mich.

[73] Assignee: The Firestone Tire & Rubber Company, Akron, Ohio

[21] Appl. No.: 244,246

[22] Filed: Mar. 16, 1981

[51] Int. Cl.³ .................. A62B 35/02; B65H 75/48
[52] U.S. Cl. ................................................ 242/107.7
[58] Field of Search ............ 242/107.7, 107.6, 107.12; 280/806, 807, 808, 803; 297/475-478

[56] References Cited

U.S. PATENT DOCUMENTS

| Re. 29,095 | 1/1977 | Heath | 242/107.7 |
|---|---|---|---|
| 3,973,786 | 8/1976 | Rogers | |
| 4,023,746 | 5/1977 | Magyar | 242/107.7 |
| 4,034,931 | 7/1977 | Fisher | 242/107.4 D |
| 4,057,199 | 11/1977 | Scibbe et al. | 242/107.7 |
| 4,106,722 | 8/1978 | Inukai et al. | 242/107.7 |
| 4,124,175 | 11/1978 | Cislak | 242/107.7 |
| 4,149,683 | 4/1979 | Fisher | 242/107.7 |
| 4,270,709 | 6/1981 | Inukai et al. | 242/107.7 |

*Primary Examiner*—John M. Jillions
*Attorney, Agent, or Firm*—Miller, Morriss & Pappas

[57] ABSTRACT

An improved comfort mechanism which is located on the frame of a seat belt retractor and which vastly simplifies comfort mechanism construction. The mechanism is loaded into a closable disc-like shallow case. A ratchet is keyed to the shaft of the retractor and a combination clutch plate and cam element is rested over the ratchet and frictionally pressed against the ratchet by a spring so as to turn with it limited by selected stops. A pawl normally biased out-of-contact with the ratchet is also in the case and the pawl is selectively acted upon by the cam skirt of the combination clutch plate and cam element to engage and disengage the pawl with the ratchet as the webbing is manipulated. The case is provided with a cover enclosing all parts. Case cover, combination clutch plate and cam, pawl and the ratchet may all be fabricated from plastic injection molded or formed parts.

5 Claims, 3 Drawing Figures

U.S. Patent   Jun. 7, 1983   4,386,744
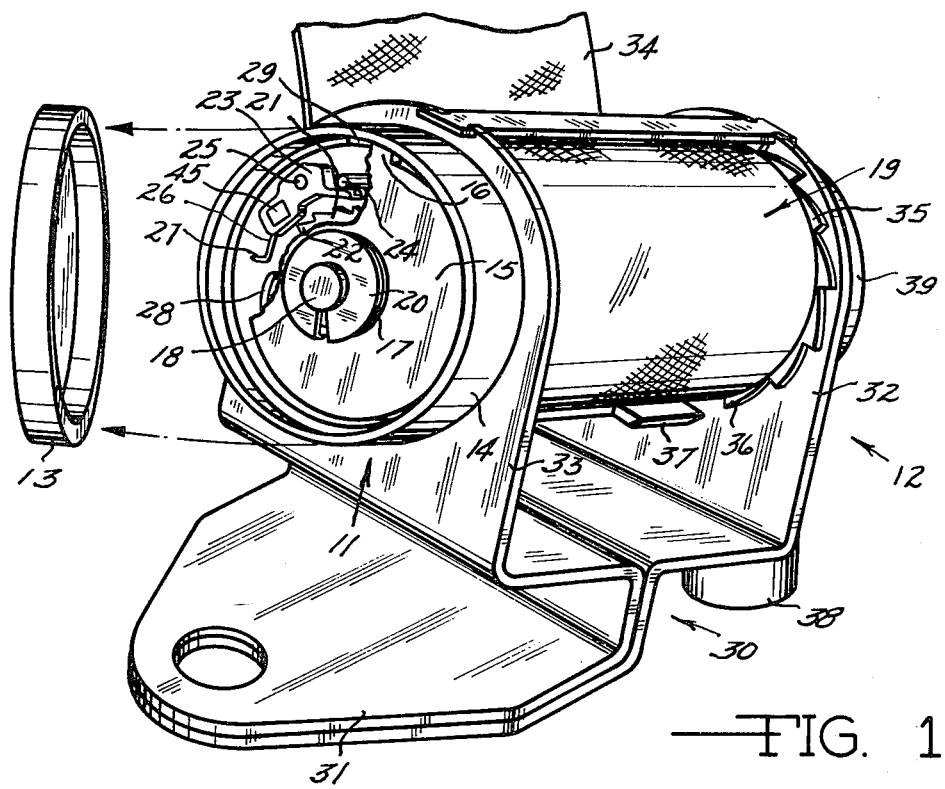
FIG. 1
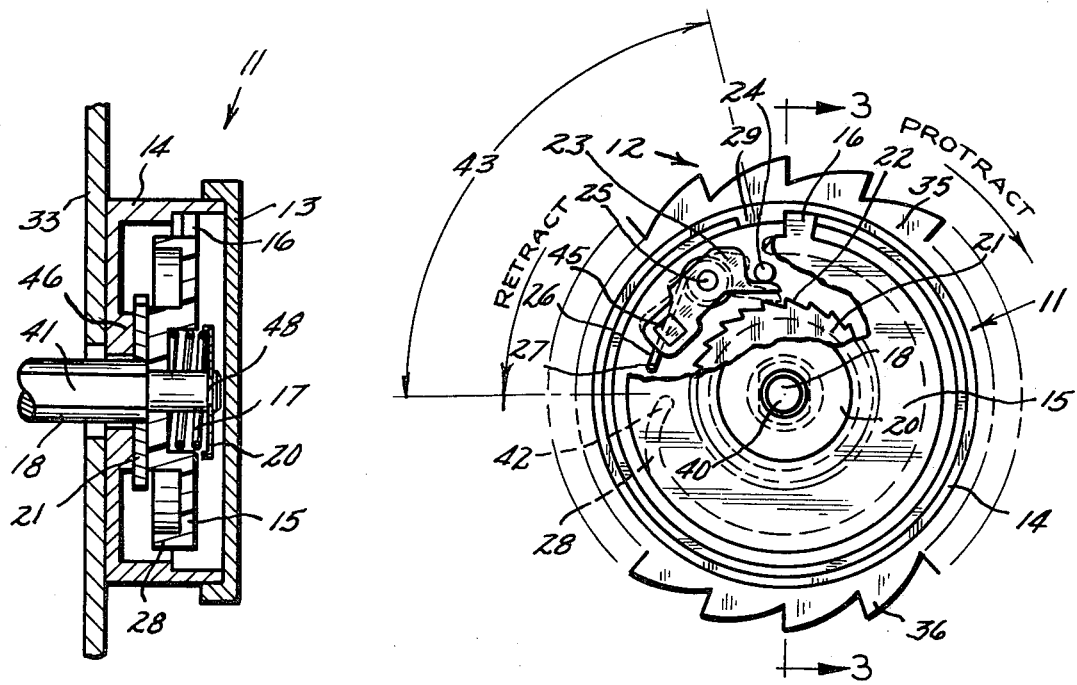
FIG. 3
FIG. 2

COMFORT MECHANISM FOR SAFETY BELT RETRACTORS

The present invention is an improved comfort mechanism for safety belt retractors and possesses the benefit of compactness and simplicity over previously known retractor comfort mechanism structures and providing an unobvious advance in the art thereof.

Comfort mechanisms are placed in safety belt retractor devices to selectively prevent retraction of the webbing or belting by the rewind spring motor while providing no interference with the emergency locking characteristics of the retractor. The reason for comfort mechanisms is to relieve the wind-up tension against the user or wearer once the webbing is in selected deployed position around the wearer. Many users of safety belts in vehicles object to the constant pressure of the webbing under retraction tension against their bodies and the comfort mechanisms have sought to eliminate this objection to safety belting so that once in place it is not constantly snugging itself against the wearer.

THE PRIOR ART

Comfort mechanisms to date fall into two general categories, the cam or friction clutch type and labyrinth latching systems. These are generally characterized in the prior art by reference to the U.S. Pat. Nos. 3,973,786 and 4,023,746 to Lloyd W. Rogers, Jr. and Joseph Magyar, respectively, and U.S. Pat. Nos. 4,034,931 and 4,149,683 to Robert L. Fisher, et al. Both systems provide no interference with the retractor emergency locking system which may be vehicle sensitive (pendulum) or acceleration sensitive (automatic locking) and both are selectively engageable or disengageable by mechanical manipulation of the comfort structure as by opening or closing doors, by selected webbing manipulation, or the like. The Reissue Pat. 29,095 of U.S. Pat. No. 3,834,646 to Robert B. Heath represents some simplification of the cam and friction clutch type devices but utilizes a combination of brake and separate clutch, each with camming surfaces to achieve rewind prevention.

In contrast to such prior art devices, the present invention advances the prior art by extreme simplification of structure to achieve reliable disabling or lock-out of rewind in a selective manner as by manipulation of webbing by the user.

Accordingly, the principal object is to provide a simple rewind prevention or disabling mechanism operating from the reel or spool of the safety belt retractor in a covered case attachable to the frame of the retractor and over the shaft extension and where the prevention element is a pawl selectively pivotal in respect to the frame toward and away from engagement against the teeth of a ratchet wheel driven by the spool or drum.

Another object is to provide a comfort mechanism easily installed on a wide variety of safety belt retractors.

Another object is to provide a stop limited cam clutch which is positionable upon rotation imitative of the direction of rotation of the reel and which interposes a surface which moves the pawl selectively into and out-of-engagement with the rewind prevention ratchet, the pawl being normally under a bias away from engagement with the ratchet.

The structural simplicity characterizing the present invention involves integration of complex functions in combination structural pieces but those skilled in the art will readily appreciate the structure as being wholly unobvious from the hitherto complex devices for achievement of similar functions in safety belt retractors. Thus, other objects including economy, repetitive accuracy, and long service will be appreciated as the description proceeds.

The structure of the present invention minimizes space requirements, makes available extensive use of plastic parts which are economically manufactured, and are easily assembled in a compact, low-profile covered case.

General Description

The present invention is an improved rewind preventing or disabling structure attachable to any style of safety belt retractor in which a spring driven drum is biased to retract safety belt webbing as the withdrawn webbing is relaxed. The spool or drum is journalled in a retractor frame as between spaced-apart walls thereof. Most such retractors include means locking the spool or drum against withdrawal of webbing and most of such devices include a ratchet element which rotates with the drum and a lock or pawl element which engages the teeth of the ratchet rotated with the drum and the pawl or lock obeying some form of sensed condition as, for example, by centrifugal, inertial, hydraulic, pneumatic, pendulum, or electromechanical sensing of an emergency situation such as upon sudden braking or sudden acceleration or deceleration of the vehicle or webbing. Such blocking of the spool against protraction of webbing holds the user of the safety harness in place. When the sensed condition for braking against protraction does not obtain, then the webbing may be withdrawn against the retraction tension of the retractor spring motor. The spring motor operates on the webbing seeking to draw it back onto the drum. Thus, without more, the retractor is always operating to rewind and in most instances if the harness and connective webbing is fastened around the user, then it cannot be retracted further by the spring motor but the spring bias applied by the motor is always felt in the tension in the webbing against the body of the user. Such tension is annoying to users and the present invention is a comfort structure directed to relieving the return tension by selected manipulation of the webbing by the user to block or disable rewind. At no time does the rewind prevention of the present invention prevent extension of the webbing. The rewind prevention structure of the present invention comprises a cylindrical shallow case which fits flat against and is attached to the retractor frame. Through the axial center of the case is an opening through which the stub end of the shaft of the retractor drum or spool extends. Around the shaft opening is a boss. Keyed to the shaft is a ratchet wheel having teeth lockable against rewind motion in the shaft and drum. The boss provides a thrust journal step for the ratchet wheel. The shaft extends beyond the key to the ratchet wheel in an extension of reduced diameter. Over the reduced diameter portion of the shaft is rotatably journalled a combination clutch plate and cam which is frictionally engaged against the flat portion of the rewind preventing ratchet wheel and hence is movable with the movement of the shaft. The combination clutch plate and cam is thus frictionally driven by the flat surface engagement against the rewind preventing ratchet wheel. The frictional engagement is assured by the spring over the shaft end acting or thrusting axially against the combination clutch plate and cam. The spring is held under compression by a spring compressor disc such as an E-clip engaged in a receiving groove adjacent the end of the shaft. Radially extending from the combination clutch plate and cam is a stop arm which limits rotation of the combination clutch plate and cam by engagement against a stop provided in the case. The cam surface portion of the combination plate faces toward the retractor frame and nest within the case. The cam surface is a depending arcuate flange or skirt integral in the combination clutch plate and cam moving with the combination plate for selective manipulation of a pawl element. The pawl element operates in the plane of the rewind preventing ratchet wheel and is movable toward and away from disabling engagement with the ratchet wheel. Normally, the rewind prevention pawl is biased away from the rewind preventing ratchet wheel. When selectively influenced by the cam, the pawl locks against the teeth of the rewind prevention ratchet wheel. As will be seen, withdrawal of webbing clears the pawl of the rewind prevention retractor but relocks the rewind prevention where the selected movement of the cam applies a bias on the pawl toward the teeth of the rewind prevention ratchet wheel. When so engaged, the rewind is blocked or disabled but the lock against webbing withdrawal is not interfered with. The rewind preventing structure of the present invention is closed by a cover or cap preventing access to the mechanism by dust, dirt, and random loose objects. It may be thus sealed or may be opened to facilitate repair, replacement or inspection.

IN THE DRAWINGS

FIG. 1 is a perspective partially exploded view of a seat belt retractor fitted with the invention set forth herein and with the cover removed.

FIG. 2 is a side elevation view of the present invention and with a portion of the combination clutch and cam plate cut-away to reveal the rewind prevention pawl biased away from contact with the retraction preventing ratchet and pivotal to contact with the rewind prevention ratchet when the bias is overcome.

FIG. 3 is a full cross-section elevation view of the present invention taken on the line 3—3 of the FIG. 2 and fastened against the retraactor frame.

SPECIFIC DESCRIPTION

Referring to the drawing and with first particularity to the FIG. 1 thereof, the rewind preventing or disabling structure 11 of the present invention is shown attached to seat belt retractor 12 and the cover 13 of the rewind preventing structure 11 is removed to indicate the simplicity of the interior of the shallow case 14 housing the combination clutch plate and cam 15 with its integral and radially extending dog or stop arm 16. The compression spring 17 is operably secured over the shaft 18 of the drum or spool 19 of the retractor 12 by means of the compressor disc 20 connected to the end of the shaft 18. The spring 17 forces the combination clutch and cam 15 against the rewind preventing ratchet wheel 21. As will be seen, the ratchet wheel 21 is keyed to the shaft 18 so as to turn therewith. The teeth 22 of the rewind preventing ratchet wheel 21 are aligned to be locked against the rewind direction of movement by the pawl element 23 located in the bottom of case 14 and the pawl 23 is biased (as by spring or gravity) normally out-of-engagement with the teeth 22 and against the upstanding pin-stop 24 in the case 14.

The pawl 23 is pivotal toward and away from the teeth 22 of the rewind prevention ratchet wheel 21 on the pivot 25. The wireform resilient follower element 26 runs around the pivot and is secured to the pawl 23 at one end and at the other end extends in an outwardly extending tail portion 27 functioning as a feeler to resiliently and selectively engage the cam surface 28 which depends as an integral skirt from the combination clutch plate and cam 15. An integral stop 29 in the case 14 extends radially inwardly to interfere with complete revolution of the combination clutch and cam plate 15 at engagement with the arm 16.

The retractor 12 comprises a frame 30 which provides a mounting pad 31 and upstanding spaced-apart flanges or walls 32 and 33. The walls 32 and 33 provide journal support for the spool or drum 19 which carries the belt or webbing 34. The spool or drum 19 includes at least one, and usually two, ratchet wheels 35 and the teeth 36 thereof are oriented so that upon withdrawal from the drum 19 the withdrawal rotation can be stopped by engagement against a pawl bar 37. The pawl bar 37 is also operably supported by the frame 30 and the engagement of the pawl bar 37 with the ratchet wheel 35 is by reason of a sensed emergency condition such as sudden acceleration or deceleration of the vehicle in which the retractor is mounted as by displacement of the pendulum element 38 and consequent direct or indirect inertial activation of the pawl bar 37. A rewind mechanism or motor 39 is secured to the frame 30 over the shaft 18 and this usually comprises a spring motor well known in the art secured at one end to the retractor frame 30 at encasement of the mechanism 39 and at the other end to the shaft 18 of the spool 19. The rewind motor 39 is thus a rotating bias applied to the drum 19 urging a retracting tension on the webbing 34. The rewind prevention or comfort structure 11 disables of blocks the rewind upon selected movement of the webbing 34 and consequent coordinated movement of the drum 19. As seen in the FIG. 1, withdrawal or protraction of the webbing 34 from the drum 19 causes clockwise motion of the shaft 18, and the rewind preventing ratchet wheel 21. Such withdrawal is never interrupted by the pawl 23 because the teeth 22 are ramped to displace or lift the pawl 23 from seating contact during withdrawal movement. However, release of the webbing 34 allows the webbing drive motor 39 to rewind the webbing on the drum 19 by rotation of the drum 19 in a counterclockwise direction, as shown. Since the ratchet wheel 21 also moves in a counterclockwise direction (as shown) impingement of pawl 25 against teeth 22 then locks the rewind preventing ratchet 21 and relieves tension in the webbing 34 and in any connected harness.

By reference to the FIG. 2 the function of the combination clutch plate and cam 15 will be better understood. The directional arrows show the direction of protraction and retraction related to the ratchet wheel 35 of drum 19 with teeth 36 which forms a flange plate of the webbing storage drum 19. For clarity, the wall 33 of retractor frame 30 has been removed. The head 40 of the shaft 18 is clearly indicated and the flats 41 indicate that the rewind prevention ratchet 21 is keyed to the shaft 18 of drum 19. The thrust disc 20 is secured over shaft 18 and compresses the spring 17 against the combination clutch plate and case 15 so that upon rotation of the ratchet wheel 21 the combination plate 15 moves correspondingly, limited by engagement of the dog 16 against the stop 29 integrally formed in the case 14. The depending cam skirt 28 of the combination clutch plate and cam element 15 turns gradually inward at the tip 42, as shown, and is gapped in a zone of selected width 43 until it recommences adjacent the dog 16. The function of the camming portion 28 will be appreciated in respect to the follower or tail portion or feeler 27 of the wireform 26. On protracting movement of the drum 19 (wheel 35), the clutch plate and cam element 15 rotates clockwise as seen in FIG. 2 and the tip 42 of the cam portion 28 assures that the follower tail 27 follows on the outside of the cam skirt or blade 28 thereby urging the pawl 23 into engagement with the rewind preventing ratchet 21. As indicated, protraction is not interrupted but upon retraction motion in the drum 19, and corresponding movement in the rewind prevention ratchet 21, the pawl 23 lockably engages the ratchet 21 in prevention of retraction. Protraction registering the pawl 23 with the gap 43 allows the pawl 23 freedom to follow its built-in bias (spring or gravity) against the pawl post pin or rest 24 and away from engagement with the rewind prevention ratchet 21. In this connection, the weight 45, when the retractor rewind prevention structure 11 is positioned as shown in FIG. 2, rotates the pawl 23 around its pivot 25 and against the rest 24 biased out-of-contact with the ratchet 21. With extended protraction of webbing 34 around the body of a user or wearer, the arm 16 of the cam and clutch plate 15 ultimately engages the stop 29 (shy of a complete revolution) in the case 14 and the follower tail 27 is then free of the cam skirt 28. By allowing slight retraction, then, the track 28 traps the follower tail 27 (say about four inches) until freed by relocation of the gap 43 opposite the pawl 26, then by withdrawing or protracting the webbing about one inch, the pawl 26 is urged into engagement with the ratchet 21 thereby blocking any further retraction of the spool or drum 19 and this relieves webbing tension on the user in a simplicity of operation not previously achieved.

The feeler 27, during retraction of webbing, is caught by the cam skirt 28 on the radially inward surface thereof which forces the pawl 23 out of engagement with the teeth 22 of ratchet wheel 21 and retraction continues until the gap 43 gets opposite the pawl 23. Then, by protracting the belt or webbing, the portion 42 of the cam skirt 28 engages feeler 27 on the outside of cam skirt 28 to force the pawl 23 into engagement with the ratchet 21 in prevention of further retraction. At the point of unbuckling of the belt or webbing, the belt or webbing is protracted until the dog 16 strikes the stop 29 and then full retraction of the belt or webbing can take place.

All of the parts except the spring 17 and wireform 26 in the rewind prevention structure and the spring retainer 20 may be inexpensively mass produced using high precision dimensionally stable plastics thereby allowing substantial economies and easy fabrication. The cover 13 may be sealed to the case 14 in prevention of tampering and in assurance of keeping dust, dirt and foreign matter from the working parts. The cam surfaces are easily adjusted to function in conjunction with the pawl follower tail 27 and the interval spacing or gap 43 in the cam skirt 28.

In FIG. 3 the simple assembly relationship of the rewind prevention structure is clearly appreciated. The case 14 slips over the shaft 18 and the boss 46 provides a thrust receiving pedestal locating the ratchet element 21 pressed or keyed onto the shaft 18 over the flat 41. Then the combination clutch plate and cam element 15 is placed over the shaft 18 flush against the ratchet 21 in frictional relation and the radial arm 16 extends from the element 15 to a stop relation against the case short of one complete revolution. The pivot pin 25 and the pawl post or stop 24 may be integrally molded in the case 14 and the rewind prevention pawl 23 is nested on the pin 25 and biased against the post 24 with its wireform feeler or follower 26 located in operative position in respect to the adjacent ratchet 21. The pawl 23 does not interfere with the cam skirt 28 but the follower tail or feeler 27 thereof extends into the path of cam 28 and is selectively moved in accord with motion of the combination clutch plate and cam element 15. The clutch spring 17 nests in the dish-like cavity 47 in the outside of the element 15 and the spring 17 is held in place by the spring retainer 20 secured in the groove 48 in the shaft 18. The case 14 fits flush against the flange or wall 33 of the retractor frame 30 and the cover 13 closes the case 14 across the open face thereof. The nesting relationship of elements within the case 14 assures compact design and ease of manufacture and assembly.

Having thus described an operative embodiment of the rewind prevention device of the present invention, those skilled in the art will readily appreciate changes, modifications and improvements therein and such changes, modifications and improvements therein are intended to be embodied in the spirit of the present invention limited only by the scope of my hereinafter appended claims.

I claim:

1. A comfort mechanism for safety belt retractors, the retractors including a frame, a webbing storage drum on a shaft supported in the frame and having a rewind motor acting on one of the retractor shaft and lock-out means preventing protraction of webbing under emergency conditions, the combination comprising:
   a shallow cylindrical case adapted to be attached to the frame of a retractor and said case having an opening in one side for the projection of said retractor shaft and said case including a stop;
   a ratchet keyed to said shaft and resting against said case;
   a pawl element normally biased away from contact with said ratchet and said pawl pivotal in said case toward and away from said ratchet for locking said ratchet;
   a combination clutch plate and cam element, said cam element extending in an integral skirt to selectively manipulate said pawl and frictionally rotatable with said ratchet and said combination element limited to less than one revolution by engagement against said stop in said case, said skirt having a gap registrable with said pawl and said skirt urging said pawl to engagement with said ratchet on one side of skirt and away from engagement with said ratchet on the other side of said skirt; and
   spring means acting coaxially against said shaft and said combination element urging compression contact between said combination element and said ratchet.

2. In the combination of claim 1 wherein said pawl includes a resilient feeler projecting upward from said pawl and into an interference path with said cam element portion of said combination clutch plate and cam element and a cover is provided closing said case.

3. In the combination of claim 2 wherein said resilient feeler is selectively manipulated by said cam element portion of said combination element and urging said pawl toward and away from blocking engagement with said ratchet.

4. A frame attachable comfort mechanism for safety belt retractors, the retractor including a frame, a webbing storage drum on a shaft and rotatably supported in the frame and having a rewind motor operably connected to said drum and a lock selectively preventing protraction of webbing from said drum, the combination comprising:

a shallow cylindrical case attachable to the frame of the retractor and having an axial opening through one side adjacent said frame for the projection of the retractor shaft therethrough and said case including an integral stop;

a ratchet keyed to said shaft and rotatably resting against an end wall of said case;

a pawl element having a resilient feeler extending upwardly therefrom and normally biased away from contact with said ratchet and said pawl element pivotal in said case toward and away from blocking engagement with said ratchet in prevention of retraction of said retractor drum;

a pin stop in said case against which said pawl rests under bias away from said ratchet;

a combination element having integral clutch and cam portions, said cam portion depending toward said case in a selected interference path with said resilient feeler and limited by engagement with said integral stop in said case to rotation less than a full revolution and said cam portion having a gap registrable with said pawl and said cam portion urging said pawl into engagement with said ratchet when said feeler is on one side of said cam portion and away from engagement with said ratchet on the other side of said cam portion;

spring means over said shaft and acting between said shaft and said combination element providing frictional drive of said combination element by movement of said ratchet; and a cover completely closing said case across the open face thereof.

5. In the combination of claim 4 wherein said case, said combination element, said pawl, and said ratchet are all high volume precision molded from plastic material having good dimensional stability and requiring minimal machining.

* * * * *

UNITED STATES PATENT AND TRADEMARK OFFICE
CERTIFICATE OF CORRECTION

PATENT NO. : 4,386,744
DATED : 1983 June 7
INVENTOR(S) : Wallace Carson Higbee

It is certified that error appears in the above-identified patent and that said Letters Patent is hereby corrected as shown below:

Column 3, line 9, "nest" should read --- nests ---

Column 3, line 45, "retraactor" should read --- retractor ---

Column 4, line 37, "of" should read --- or --- (first occurrence)

Column 6, line 34, insert "end" after "one"

Signed and Sealed this

Sixteenth Day of August 1983

[SEAL]

Attest:

GERALD J. MOSSINGHOFF

Attesting Officer

Commissioner of Patents and Trademarks